(12) United States Patent
Terrell

(10) Patent No.: US 10,098,807 B1
(45) Date of Patent: Oct. 16, 2018

(54) WALKING CANE DEVICE

(71) Applicant: Melba Terrell, Philadelphia, PA (US)

(72) Inventor: Melba Terrell, Philadelphia, PA (US)

( * ) Notice: Subject to any disclaimer, the term of this patent is extended or adjusted under 35 U.S.C. 154(b) by 0 days.

(21) Appl. No.: 15/852,287

(22) Filed: Dec. 22, 2017

Related U.S. Application Data

(60) Provisional application No. 62/511,243, filed on May 25, 2017.

(51) Int. Cl.
| | |
|---|---|
| *A61H 3/06* | (2006.01) |
| *G09B 21/00* | (2006.01) |
| *G01C 21/36* | (2006.01) |
| *A45B 3/04* | (2006.01) |
| *H04W 4/80* | (2018.01) |

(52) U.S. Cl.
CPC ............. *A61H 3/061* (2013.01); *A61H 3/068* (2013.01); *G01C 21/3629* (2013.01); *G01C 21/3641* (2013.01); *G01C 21/3661* (2013.01); *G09B 21/006* (2013.01); *A45B 3/04* (2013.01); *H04W 4/80* (2018.02)

(58) Field of Classification Search
CPC ..................................................... A61H 3/061
See application file for complete search history.

(56) References Cited

U.S. PATENT DOCUMENTS

| | | | | |
|---|---|---|---|---|
| 6,356,210 B1* | 3/2002 | Ellis | ....................... | A61H 3/061 |
| | | | | 135/67 |
| 6,774,795 B2* | 8/2004 | Eshelman | ............ | A61B 5/0002 |
| | | | | 340/539.1 |
| 7,706,212 B1* | 4/2010 | Campbell | .............. | A61H 3/061 |
| | | | | 367/116 |
| 8,627,839 B1* | 1/2014 | Martinez | .................. | A45B 3/00 |
| | | | | 135/66 |
| 8,812,231 B1* | 8/2014 | Brickous | ................ | A61H 3/068 |
| | | | | 701/488 |
| 9,044,374 B1* | 6/2015 | Stimpson | ............... | A61H 3/061 |
| 9,125,790 B2* | 9/2015 | Van Gerpen | ............. | A61H 3/04 |
| 9,180,063 B2* | 11/2015 | Friedman | ............... | G08C 17/02 |
| 9,386,830 B2* | 7/2016 | Crowhurst | ............... | A45B 9/00 |
| 9,618,624 B2* | 4/2017 | Krauss | ..................... | A45B 3/08 |
| 2008/0072940 A1* | 3/2008 | Cheng | ..................... | A45B 3/00 |
| | | | | 135/66 |
| 2008/0251110 A1* | 10/2008 | Pede | ...................... | A61H 3/061 |
| | | | | 135/66 |

\* cited by examiner

*Primary Examiner* — Noah Chandler Hawk
(74) *Attorney, Agent, or Firm* — RG Patent Consulting, LLC; Rachel Gilboy

(57) ABSTRACT

An improved walking cane device adapted to be used by a blind person to aid in walking and navigating upon any walking surface, use information pre-programmed upon a computer module, use information gathered by a receiver member in an elongated shaft, and send information through a speaker member in the elongated shaft and the wireless earpiece to the blind person for aiding in walking and navigating upon any walking surface.

14 Claims, 4 Drawing Sheets

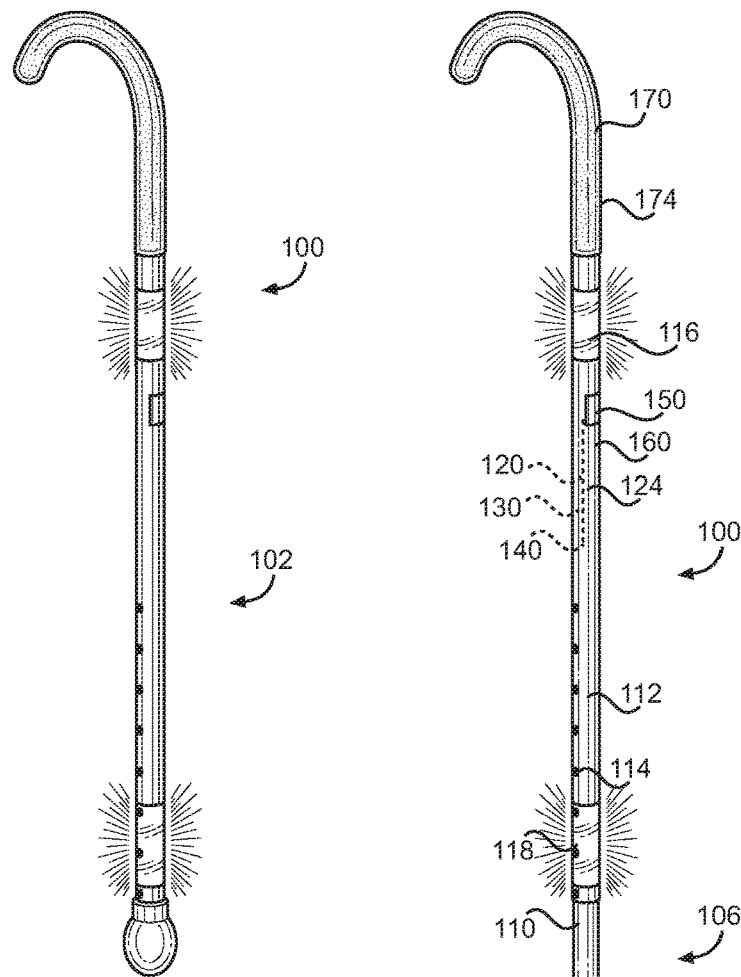
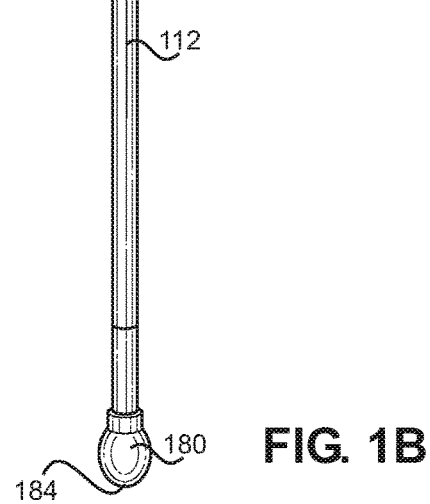
FIG. 1A
FIG. 1B

WALKING CANE DEVICE

CROSS-REFERENCE TO RELATED APPLICATION

The present application is related to and claims priority from prior provisional application Ser. No. 62/511,243, filed May 25, 2017 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of walking aids and more specifically relates to an improved walking cane device adapted to be used by a blind person to aid in walking and navigating upon any walking surface, use information pre-programmed upon a computer module, use information gathered by a receiver member in an elongated shaft, and send information through a speaker member in the elongated shaft and the wireless earpiece to the blind person for aiding in walking and navigating upon any walking surface.

2. Description of the Related Art

According to recent estimates, there are approximately 10 million blind and visually impaired people in the United States. Visual impairment is described as vision that cannot be fully corrected by ordinary prescription lenses, medical treatment, or surgical procedures. The term visual impairment also includes those conditions that range from the presence of good usable vision, low vision, to the absence of any sight at all: total blindness. There are a variety of terms used when people refer to visual impairment, including legal blindness, severe visual impairment, visually impaired, and low vision.

Blindness has many causes including cataract, trachoma, glaucoma, accidents, diabetic retinopathy, and age-related macular degeneration. Surprisingly, Vitamin A deficiency is the leading cause of blindness worldwide. According to the American Foundation for the Blind one in six Americans age 65 and older are blind or severely visually impaired. Further, the population of those who suffer varying degrees of visual impairment is expected to more than double by the year 2030, when the last generation of baby-boomers reaches age 65. Each year, only a small fraction of older Americans experiencing age-related vision loss receives the vision-related rehabilitation services for which they are eligible.

Unfortunately, presented with the alarming statistics above, it is becoming increasingly clear that those with vision problems need all the help they can get, in many aspects of daily living. Specifically, the simple act of walking through one's neighborhood can be extremely challenging for those who suffer visual impairment. Typically, those who have varying degrees of blindness will employ a white cane as a means of alerting others to their impairment, as well as monitoring ground conditions. Specifically, by using a cane, a blind person is able to discern breaks in a sidewalk, steps, or even puddles to avoid. Still, as practical as these devices are, improvements to their design that facilitate enhanced use are always welcome Various attempts have been made to solve problems found in walking aids art. Among these are found in: U.S. Pub. No. 2009/0223546 to Albert Nazarian; U.S. Pat. No. 5,097,856 to Hsieh Chi-Sheng; and U.S. Pat. No. 6,356,210 to Christ G. Ellis. This prior art is representative of walking aids with audio and visual means.

Ideally, an improved walking cane device should be user-friendly and safe in-use and, yet should operate reliably and be manufactured at a modest expense. Thus, a need exists for an improved walking cane device adapted to be used by a blind person to aid in walking and navigating upon any walking surface, use information pre-programmed upon a computer module, use information gathered by a receiver member in an elongated shaft, and send information through a speaker member in the elongated shaft and the wireless earpiece to the blind person for aiding in walking and navigating upon any walking surface and to avoid the above-mentioned problems.

BRIEF SUMMARY OF THE INVENTION

In view of the foregoing disadvantages inherent in the known walking aids device art, the present invention provides an Improved Walking Cane Device. The general purpose of the present invention, which will be described subsequently in greater detail is to provide an improved walking cane device adapted to be used by a blind person to aid in walking and navigating upon any walking surface, use information pre-programmed upon a computer module, use information gathered by a receiver member in an elongated shaft, and send information through a speaker member in the elongated shaft and the wireless earpiece to the blind person for aiding in walking and navigating upon any walking surface.

An improved walking cane device comprises: an elongated shaft; a handle member; a tip member; wireless earpiece; and a remote global positioning satellite system. The elongated shaft includes two hollow shaft portions telescopingly connected together to thereby adapt the elongated shaft to be adjustable in length; a releasable locking member adapted to telescopingly and releasably lock said two hollow shaft portions together at a chosen one of a plurality of predetermined positions; a computer module including a computer application; a receiver member; a transmitter member; a speaker member; and a power source. The improved walking cane device is adapted to be used by a blind person to aid in walking and navigating upon any walking surface, use information pre-programmed upon said computer module, use information gathered by the receiver member in said elongated shaft, and send information through said speaker member in said elongated shaft and said wireless earpiece to said blind person for aiding in said walking and navigating upon any walking surface.

The computer application is encoded upon and is adapted to provide data and information to the computer module. The data and information includes pre-programmed mapping, hazard, structural terrain features, and field navigation data and information. The computer module is located within one of the two hollow shaft portions.

The receiver member is located within one of the two hollow shaft portions, is electronically connected to the computer module, and is adapted to receive electronic signals and send the electronic signals to the computer module. The transmitter member is located within one of the two hollow shaft portions, is electronically connected to the computer module, and is adapted to send electronic signals from the computer module to a remote receiver member. The speaker member is located on an outer surface of one of the two hollow shaft portions and is electronically connected to the computer module. The power source is located within one of the two hollow shaft portions and is electronically connected to the computer module, the receiver member, and the transmitter member.

The handle member is attached to a proximal end of the elongated shaft. The tip member is attached to a distal end of the elongated shaft and is adapted to securely contact a walking surface.

The wireless earpiece includes a receiver member, a speaker member, and a power source. The receiver member is adapted to receive electronic signals from the transmitter member of the elongated shaft. The speaker member is electronically connected to the receiver member. The power source is electronically connected to the receiver member and the speaker member. The wireless earpiece is adapted to be placed on an ear of a blind person and is adapted to allow a user to hear information transmitted by the transmitter of the elongated shaft.

The remote global positioning satellite system is adapted to send real-time global positioning information to said receiver of the elongated shaft.

The present invention holds significant improvements and serves as an Improved Walking Cane Device. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, an Improved Walking Cane Device, constructed and operative according to the teachings of the present invention.

FIG. 1A shows a perspective view illustrating an Improved Walking Cane Device as shown in a retracted condition according to an embodiment of the present invention.

FIG. 1B shows a perspective view illustrating an Improved Walking Cane Device in an extended condition according to an embodiment of the present invention.

The various embodiments of the present invention will hereinafter be described in conjunction with the appended drawings, wherein like designations denote like elements.

DETAILED DESCRIPTION

Figure 2:
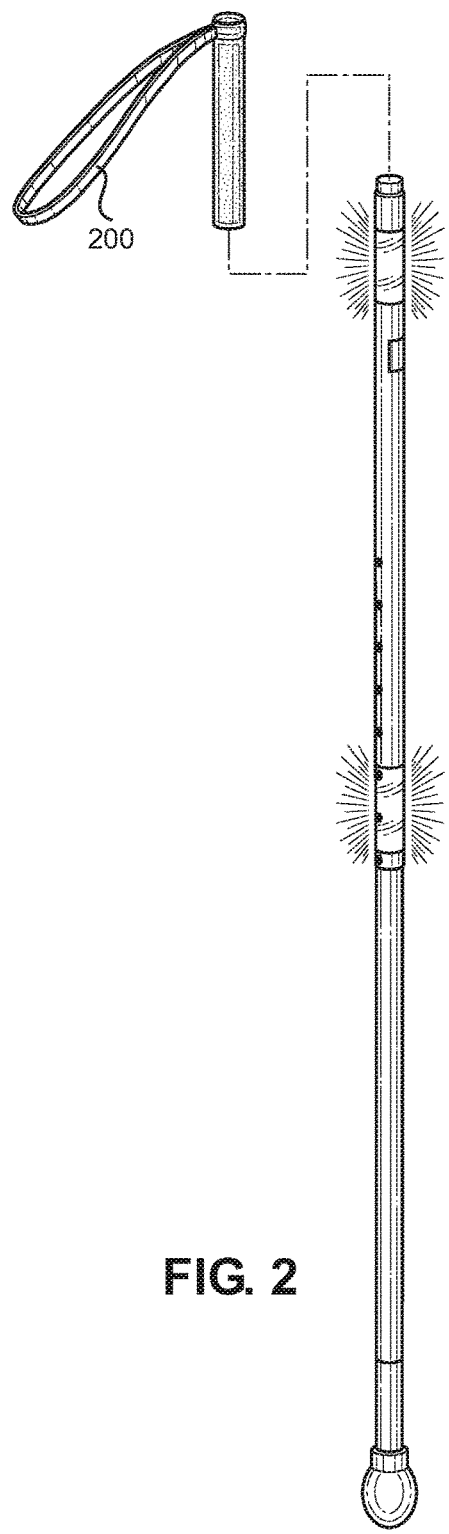
FIG. 2 shows a perspective view illustrating the Improved Walking Cane Device according to an embodiment of the present invention.

As discussed above, embodiments of the present invention relate to a walking aid device and more specifically relates to an improved walking cane device adapted to be used by a blind person to aid in walking and navigating upon any walking surface, use information pre-programmed upon a computer module, use information gathered by a receiver member in an elongated shaft, and send information through a speaker member in the elongated shaft and the wireless earpiece to the blind person for aiding in walking and navigating upon any walking surface.

Generally speaking, the Improved Walking Cane Device comprises a specially designed cane comprising a sensor-operated apparatus that vocalizes descriptions of the surrounding areas. Similar in appearance to a traditional walking cane, the Improved Walking Cane Device would be an elongated, cylindrical shaped walking stick measuring an ample forty-two to forty-eight inches (42"-48") in length for adults; a model made expressly for children would contain a length of thirty to thirty-six (30"-36") inches.

Typically, those who have varying degrees of blindness will employ a white cane as a means of alerting others to their impairment, as well as monitoring ground conditions. Similar in appearance to a traditional white cane used by the seeing impaired, The Improved Walking Cane Device would be an elongated, cylindrical shaped walking stick measuring an ample twenty-three to fifty-eight inches (23"- 58") in length. The two section, easy to use hole to connect and lock system allows for quick adjustment for customizing the cane to the most comfortable height. (The convenience of one cane designed for adult or child use).

The Improved Walking Cane Device would be white in color, made of top grade aluminum material designed for eco-friendly compatibility and protective housing, facilitating use during any kind of weather without compromising the, engineered electronic components, software and delicate micro technology hardware located in the upper shaft of the cane. Positioned at the proximal end of the unit would be an ergonomically designed and breathable soft-grip interchangeable black handle, choice of "Standard Straight" or "Custom Curved," both with a soft plastic wrist strap, and configured expressly to facilitate a firm and comfortable hold during use.

The Improved Walking Cane Device shaft is light-weight for easy handling and maneuvering and would also boast an integrated slim line speaker unit, out of which would emit the audio capabilities of the device. The outer shaft design will also house the reflective product logo and light reflectors placed along the cane joined by the easily applied "Oval Red Plastic Tip," located at the distal end of the cane. This would provide smooth surface maneuvering with all features serving to alert motorists and other pedestrians to the user's presence as well as visual impairment.

Additional features include; Companion Wireless Bluetooth®—supportive technology enabled ear set, labeled in Braille, verbally relaying programmed mapping and desired field navigation data, privately communicating and receiving commands discretely with the user. Also paired with the cane to detect and relay distance and multiple moving objects to the user; and, Contingency Wired Earphone—to support failed 'Bluetooth' audio feed.

The Improved Walking Cane Device will preferably enable blind or visually impaired individuals to more easily navigate neighborhoods, city sidewalks, and even their own home in a simple and safe fashion. Boasting a number of clever enhancements that facilitate ease of use, this unique cane may prove an invaluable commodity to anyone who suffers blindness, affording an extra measure of independence and self-sufficiency. The Improved Walking Cane Device may truly revolutionize cane use and is sure to be well received by the millions of Americans who are visually impaired.

Figure 3:
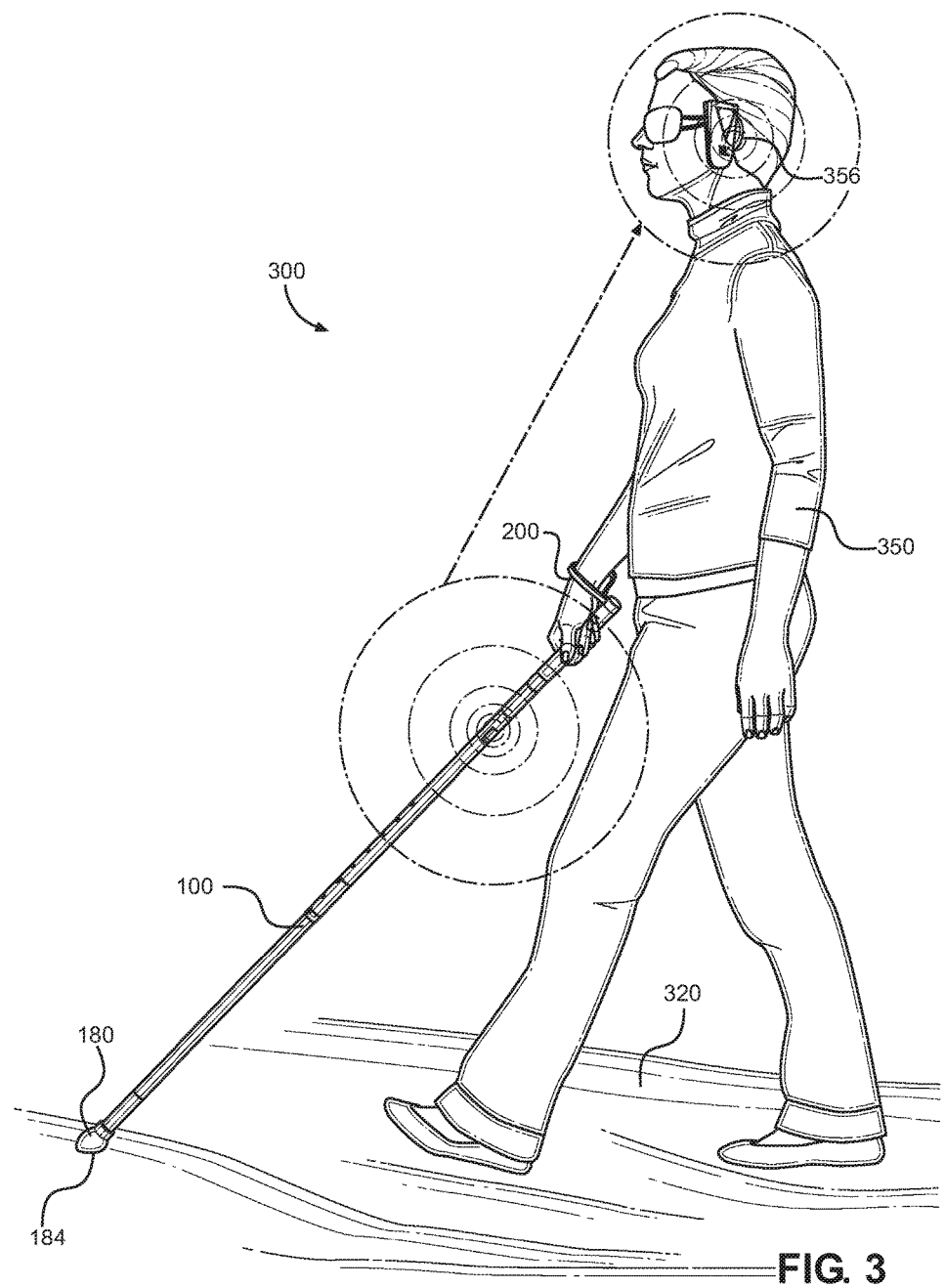
FIG. 3 is a perspective view illustrating of the Improved Walking Cane Device in an in-use condition according to an embodiment of the present invention.

Referring now to FIGS. 1-3, showing perspective views illustrating improved walking cane device 100 according to an embodiment of the present invention of FIG. 1.

Improved walking cane device 100 comprises: elongated shaft 110; handle member 170 tip member 180; wireless earpiece 400; and is adapted for use with a remote global positioning satellite system. Elongated shaft 110 includes two hollow shaft portions 112 telescopingly connected together to thereby adapt elongated shaft 110 to be adjustable in length; releasable locking member 114 adapted to telescopingly and releasably lock two hollow shaft portions 112 together at a chosen one of a plurality of predetermined positions; computer module 120 including computer application 124; receiver member 130; transmitter member 140; speaker member 150; and power source 160.

Two hollow shaft portions 112 of elongated shaft 112 are adapted to be releasably locked together via releasable locking member 114 to form a length of elongated shaft 110 of between thirty inches and thirty-six inches as shown in retracted condition 102 of FIG. 1A. Two hollow shaft portions 112 of elongated shaft 110 are adapted to be releasably locked together via releasable locking member 114 to form a length of the elongated shaft 110 of between forty-two inches and forty-eight inches as shown in extended condition 106 of FIG. 1B. Two hollow shaft portions 112 of elongated shaft 110 have a cylindrical shape. Two hollow shaft portions 112 of elongated shaft 110 are formed from a material chosen from a group of materials consisting of steel, aluminum, and ceramic.

Improved walking cane device 100 is adapted to be used by blind person 350 to aid in walking and navigating upon walking surface 320, use information pre-programmed upon computer module 120, use information gathered by receiver member 130 in elongated shaft 130, and send information through speaker member 150 in elongated shaft 110 and wireless earpiece 400 to blind person 350 for aiding in walking and navigating upon any walking surface 320 as shown in in-use condition 300 of FIG. 3.

Improved walking cane 100 further comprising wrist band 200 connected to handle member 170 and adapted to wrap around a wrist of blind person 350. Elongated shaft 110 further includes at least one reflector member 116 on an outer surface thereof. Elongated shaft 110 further includes at least one light member 118 attached to an outer surface of one of two hollow shaft portions 112 and is electronically connected to power source 160 and computer module 120; and wherein handle member 170 includes light button 174 on an outer surface thereof and is electronically connected to light member 118 and power source 160 and is adapted to allow blind person 350 to turn on and off light member 118 as a warning signal.

Handle member 170 is attached to a proximal end of elongated shaft 110. Tip member 180 is attached to a distal end of elongated shaft 110 and is adapted to securely contact walking surface 320. Tip member 180 includes roller member 184 rotatably attached thereto and is adapted to allow secure contact between tip member 180 and walking surface 320 while blind person 350 is walking along walking surface as shown in FIG. 3. Handle member 170 includes an outer layer of material chosen from a group of materials consisting of cotton, sponge, rubber, and silicone.

Computer application 124 is encoded upon and is adapted to provide data and information to computer module 120. The Data and information includes pre-programmed mapping, hazard, structural terrain features, and field navigation data and information. Computer module 120 is located within one of two hollow shaft portions 112.

Receiver member 130 is located within one of two hollow shaft portions 112, is electronically connected to computer module 120, and is adapted to receive electronic signals and send the electronic signals to computer module 120. Transmitter member 140 is located within one of two hollow shaft portions 112, is electronically connected to computer module 120, and is adapted to send electronic signals from computer module 120 to remote receiver member 410. Speaker member 150 is located on an outer surface of one of two hollow shaft portions 112 and is electronically connected to computer module 120. Power source 150 is located within one of two hollow shaft portions 112 and is electronically connected to computer module 120, receiver member 130, and transmitter member 140.

Figure 4:
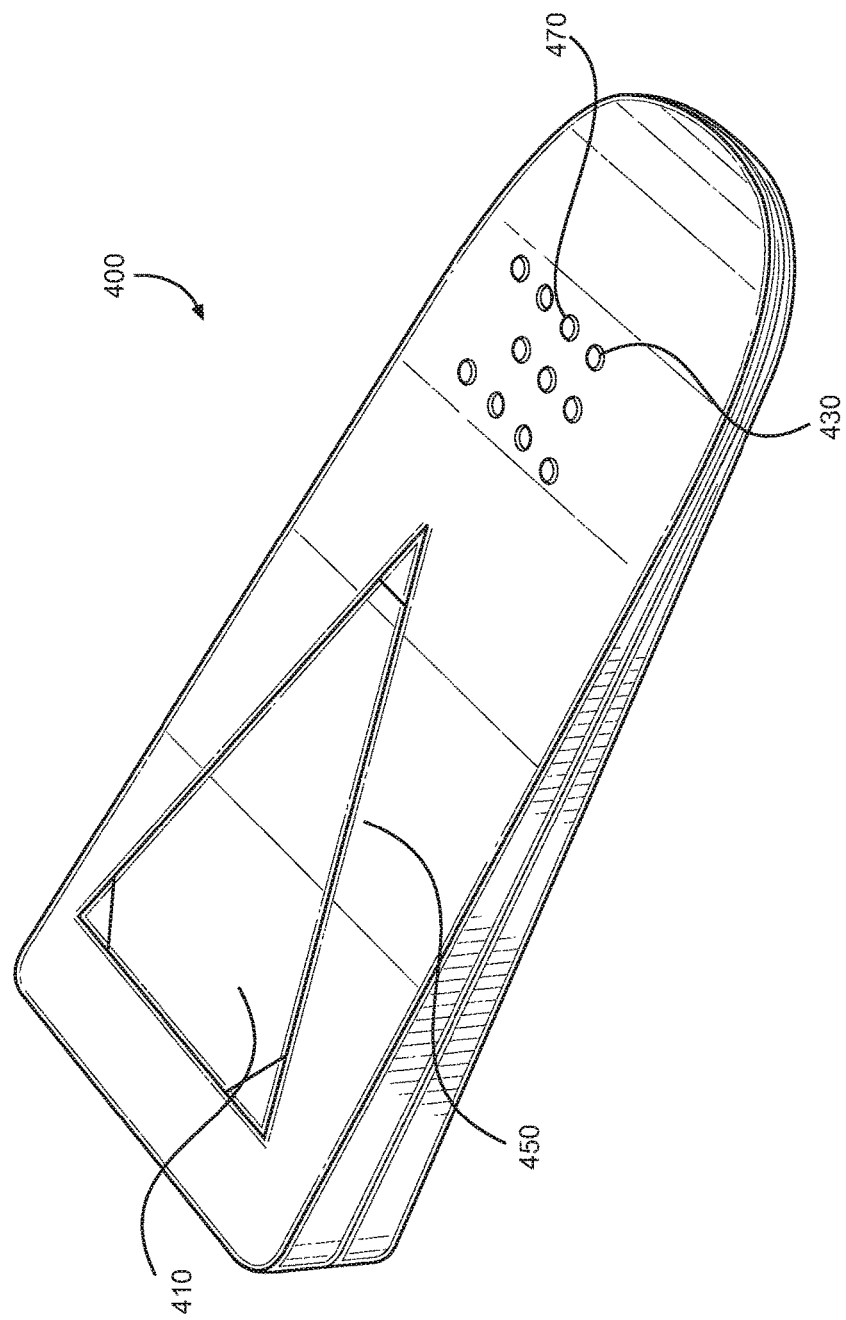
FIG. 4 is a perspective view illustrating a wireless earpiece of the Improved Walking Stick according to an embodiment of the present invention of FIG. 1.

Referring now to FIG. 4 illustrating is a perspective view illustrating wireless earpiece 400 of the Improved Walking Stick 100 according to an embodiment of the present invention of FIG. 1.

Wireless earpiece 400 includes receiver member 410, speaker member 430, and power source 450. Receiver member 410 is adapted to receive electronic signals from transmitter member 140 of elongated shaft 110. Speaker member 430 is electronically connected to receiver member 410. Power source 450 is electronically connected to receiver member 410 and speaker member 430. Wireless earpiece 400 is adapted to be placed on ear 356 of blind person 350 and is adapted to allow a user to hear information transmitted by transmitter 140 of elongated shaft 110. The remote global positioning satellite system is used to send real-time global positioning information to receiver 130 of elongated shaft 110. Wherein wireless earpiece 400 further includes Braille generator member 470 adapted to be touched by blind person 350 and receiver 130 information therefrom. Receiver 130 of elongated shaft 110 and receiver member 410 and wireless earpiece 400 and transmitter 140 of elongated shaft 110 incorporate BLUETOOTH technology The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An improved walking cane device comprising:
   an elongated shaft including:
      two hollow shaft portions telescopingly connected together to thereby adapt said elongated shaft to be adjustable in length;
      a releasable locking member;
         wherein said releasable locking member is adapted to telescopingly and releasably lock said two hollow shaft portions together at a chosen one of a plurality of predetermined positions;
      a computer module including:
         a computer application;
            wherein said computer application is encoded upon and is adapted to provide data and information to said computer module; wherein said data and information includes pre-programmed mapping, hazard, structural terrain features, and field navigation data and information;
         wherein said computer module is located within one of said two hollow shaft portions;
      a receiver member;
         wherein said receiver member is located within one of said two hollow shaft portions, is electronically connected to said computer module, and is adapted to receive electronic signals and send said electronic signals to said computer module;
      a transmitter member;
         wherein said transmitter member is located within one of said two hollow shaft portions, is electronically connected to said computer module, and is adapted to send electronic signals from said computer module to a remote receiver member;
      a speaker member;
         wherein said speaker member is located on an outer surface of one of said two hollow shaft portions and is electronically connected to said computer module;
      a power source;
         wherein said power source is located within one of said two hollow shaft portions and is electronically connected to said computer module, said receiver member, and said transmitter member;
   a handle member;
      wherein said handle member is attached to a proximal end of said elongated shaft;
   a tip member;
      wherein said tip member is attached to a distal end of said elongated shaft and is adapted to securely contact a walking surface; and
   a wireless earpiece including:
      a receiver member;
         wherein said receiver member is adapted to receive electronic signals from said transmitter member of said elongated shaft;
      a speaker member;
         wherein said speaker member is electronically connected to said receiver member; and
      a power source;
         wherein said power source is electronically connected to said receiver member and said speaker member;
      wherein said wireless earpiece is adapted to be placed on an ear of a blind person and is adapted to allow a user to hear information transmitted by said transmitter of said elongated shaft;
      wherein said receiver member and said transmitter member of said elongated shaft are adapted to send and receive information;
      wherein said improved walking cane device is adapted to be used by a blind person to aid in walking and navigating upon any walking surface, use information pre-programmed upon said computer module, use information gathered by said receiver member in said elongated shaft, and send information through said speaker member in said elongated shaft and said wireless earpiece to said blind person for aiding in said walking and navigating upon any walking surface.

2. The improved walking cane device of claim 1, further comprising a wrist band connected to said handle member and adapted to wrap around a wrist of said blind person.

3. The improved walking cane device of claim 1, wherein said elongated shaft further includes at least one reflector member on an outer surface thereof.

4. The improved walking cane device of claim 1, wherein said elongated shaft further includes at least one light member attached to an outer surface of one of said two hollow shaft portions and is electronically connected to said power source and said computer module; and wherein said handle member includes a light button on an outer surface thereof and is electronically connected to said light member and said power source and is adapted to allow said blind person to turn on and off said light member as a warning signal.

5. The improved walking cane device of claim 1, wherein said wireless earpiece further includes a Braille generator member adapted to be touched by said blind person and receiver information therefrom.

6. The improved walking cane device of claim 1, wherein said tip member includes a roller member rotatably attached thereto and is adapted to allow secure contact between said tip member and said walking surface while said blind person is walking along said walking surface.

7. The improved walking cane device of claim 1, wherein said receivers of said elongated shaft and said wireless earpiece and said transmitter of said elongated shaft incorporate BLUETOOTH technology.

8. The improved walking cane device of claim 1, wherein said two hollow shaft portions of said elongated shaft are adapted to be releasably locked together via said releasable locking member to form a length of said elongated shaft of between thirty inches and thirty-six inches.

9. The improved walking cane device of claim 1, wherein said two hollow shaft portions of said elongated shaft are adapted to be releasably locked together via said releasable locking member to form a length of said elongated shaft of between forty-two inches and forty-eight inches.

10. The improved walking cane device of claim 1, wherein said two hollow shaft portions of said elongated shaft have a cylindrical shape.

11. The improved walking cane device of claim 1, wherein said two hollow shaft portions of said elongated shaft are formed from a material chosen from a group of materials consisting of steel, aluminum, and ceramic.

12. The improved walking cane device of claim 1, wherein said handle member includes an outer layer of material chosen from a group of materials consisting of cotton, sponge, rubber, and silicone.

13. The improved walking cane device of claim 1, further comprising:
   at least one eye piece including:

a receiver member;
   wherein said receiver member is adapted to receive electronic signals from said transmitter member of said elongated shaft;
a screen member;
   wherein said screen member is electronically connected to said receiver member and is adapted to project data and information thereon; and
a power source;
   wherein said power source is electronically connected to said receiver member and said screen member;
wherein said at least one eye piece is adapted to be removably placed upon the head of a user in front of at least one eye of said user to thereby provide said data and information from said computer module visually to said user.

14. The improved walking cane device of claim 13, wherein said receiver of said at least one eye piece and said transmitter of said elongated shaft incorporate BLUETOOTH technology.

\* \* \* \* \*